US012737589B2

(12) United States Patent
Sasagawa

(10) Patent No.: US 12,737,589 B2
(45) Date of Patent: Sep. 15, 2026

(54) METHOD FOR GENERATING INFERENCE MODEL AND INFERENCE MODEL

(71) Applicant: SOCIONEXT INC., Kanagawa (JP)

(72) Inventor: Yukihiro Sasagawa, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 1366 days.

(21) Appl. No.: 17/506,303

(22) Filed: Oct. 20, 2021

(65) Prior Publication Data

US 2022/0036160 A1 Feb. 3, 2022

Related U.S. Application Data

(63) Continuation of application No. PCT/JP2020/016796, filed on Apr. 16, 2020.

(30) Foreign Application Priority Data

Apr. 23, 2019 (JP) ................................ 2019-081597

(51) Int. Cl.
*G06N 3/045* (2023.01)
*G06N 3/0455* (2023.01)
(Continued)

(52) U.S. Cl.
CPC .................................. *G06N 3/045* (2023.01)

(58) Field of Classification Search
CPC .......... G06N 3/045; G06N 3/08; G06N 20/00
See application file for complete search history.

(56) References Cited

U.S. PATENT DOCUMENTS

2016/0132783 A1* 5/2016 Ning ........................ G06N 7/01 706/52
2017/0024641 A1 1/2017 Wierzynski
(Continued)

FOREIGN PATENT DOCUMENTS

| | | | |
|---|---|---|---|
| JP | 6355800 | B1 | 7/2018 |
| JP | 2018-525734 | A | 9/2018 |
| WO | 2017052709 | A2 | 3/2017 |

OTHER PUBLICATIONS

International Search Report and Written Opinion issued in corresponding International Patent Application No. PCT/JP2020/016796, dated Jun. 23, 2020, with partial English translation.
(Continued)

*Primary Examiner* — Kamran Afshar
*Assistant Examiner* — Steven Phung
(74) *Attorney, Agent, or Firm* — Rimon P.C.

(57) ABSTRACT

An inference model generating method is a method for generating a third inference model using a trained first inference model and a trained second inference model, when a type of output data that is output from the first inference model is the same as a type of input data that is input to the second inference model, the method including: preparing a first partial inference model that includes a portion of the first inference model from an input layer through a predetermined intermediate layer; preparing a second partial inference model that includes a portion of the second inference model from a predetermined intermediate layer to an output layer; and generating the third inference model by disposing a glue layer between the first partial inference model and the second partial inference model.

17 Claims, 9 Drawing Sheets

(51) Int. Cl.

| | |
|---|---|
| ***G06N 3/0464*** | (2023.01) |
| ***G06N 3/0495*** | (2023.01) |
| ***G06N 3/08*** | (2023.01) |
| ***G06N 3/09*** | (2023.01) |
| ***G06N 3/096*** | (2023.01) |

(56) References Cited

U.S. PATENT DOCUMENTS

| | | | | |
|---|---|---|---|---|
| 2018/0268296 | A1* | 9/2018 | Zheng | G06N 3/045 |
| 2019/0005399 | A1 | 1/2019 | Noguchi et al. | |

OTHER PUBLICATIONS

Fukushima, Tatsuki et al., "A Proposal of Image Expression Conversation Method from Language Representation Using Auto Encoder," Proceedings of the 2019 IEICE General Conference, p. 51, Mar. 5, 2019, with partial English translation, cited in the ISR.

* cited by examiner

METHOD FOR GENERATING INFERENCE MODEL AND INFERENCE MODEL

CROSS REFERENCE TO RELATED APPLICATIONS

This is a continuation application of PCT International Application No. PCT/JP2020/016796 filed on Apr. 16, 2020, designating the United States of America, which is based on and claims priority of Japanese Patent Application No. 2019-081597 filed on Apr. 23, 2019. The entire disclosures of the above-identified applications, including the specifications, drawings and claims are incorporated herein by reference in their entirety.

FIELD

The present disclosure relates to an inference model generating method for generating a new inference model using a plurality of trained inference models, and to an inference model.

BACKGROUND

An inference model that includes a neural network (hereinafter, referred to as a network) is used when input data is identified or classified. As an example of a method for generating an inference model, Patent Literature (PTL) 1 states a method for generating an inference model that includes a second network by training a first network in advance using first data and a first label so that the first network generates a second label for the second network, and thereafter training the second network using the second label.

CITATION LIST

Patent Literature

PTL 1: Japanese Unexamined Patent Application Publication (Translation of PCT Application) No. 2018-525734

SUMMARY

Technical Problem

However, a load applied when an inference model is generated is often heavy with the method stated in PTL 1.

The present disclosure provides, for instance, an inference model generating method that can reduce a load applied when an inference model is generated.

Solution to Problem

An inference model generating method according to an aspect of the present disclosure is a method for generating a third inference model using a first inference model and a second inference model, when a type of output data that is output from the first inference model is the same as a type of input data that is input to the second inference model, the first inference model and the second inference model each being trained and having a multilayer structure, the method including: preparing a first partial inference model that includes a portion of the first inference model from an input layer through a predetermined intermediate layer; preparing a second partial inference model that includes a portion of the second inference model from a predetermined intermediate layer through an output layer; and generating the third inference model by disposing a glue layer between the first partial inference model and the second partial inference model, the glue layer connecting the predetermined intermediate layer of the first inference model and the predetermined intermediate layer of the second inference model.

An inference model according to an aspect of the present disclosure includes: a first partial inference model that is a portion of a first inference model that has been trained; a second partial inference model that is a portion of a second inference model that has been trained; and a glue layer disposed between the first partial inference model and the second partial inference model, the glue layer being untrained. The first partial inference model includes a portion of the first inference model from an input layer through a predetermined intermediate layer, the second partial inference model includes a portion of the second inference model from a predetermined intermediate layer through an output layer, and the glue layer connects the predetermined intermediate layer included in the first partial inference model to the predetermined intermediate layer included in the second partial inference model.

Advantageous Effects

According to, for instance, an inference model generating method according to the present disclosure, a load applied when an inference model is generated can be reduced.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS (Circumstances that have LED to an Aspect of the Present Disclosure)

When input data is identified or classified, an inference model that includes a plurality of networks is often used. An inference model that includes a plurality of networks is to be described with reference to Comparative Example 1 and Comparative Example 2.

Figure 1:
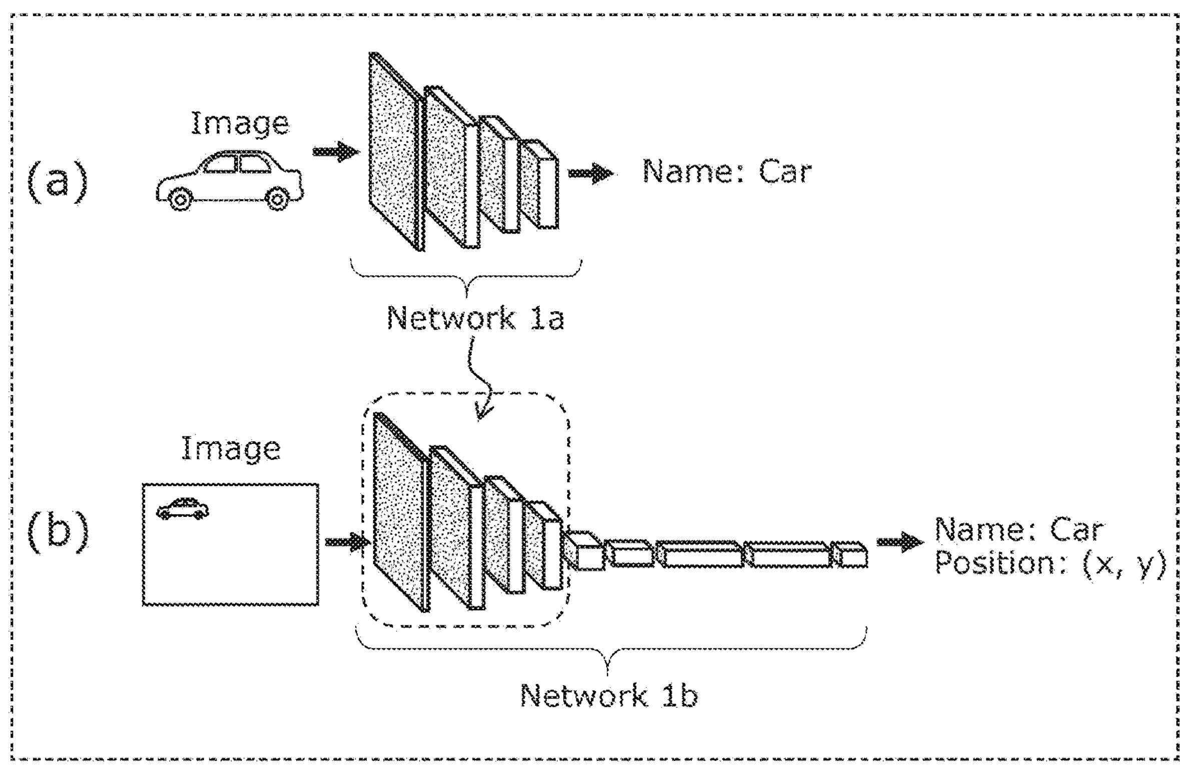
FIG. 1 illustrates an inference model according to Comparative Example 1.

FIG. 1 illustrates an inference model according to Comparative Example 1.

An inference model according to Comparative Example 1 is a model for obtaining a name and a position of an object included in an image, based on image data, and is generated by applying a network trained using one domain to another network. Specifically, in the inference model according to Comparative Example 1, image data that includes images of objects (for example, images of cars) is input to network 1*a*, and network 1*a* is trained by being taught that the output is the name of an object, "car". After that, another network for detecting a position (x, y) of an object in an image is connected downstream of network 1*a*. Thereafter, image data is input to network 1*b* resulting from such another network being connected, to teach network 1*b* that the output is the name and the position of the object, thus generating an inference model.

However, the inference model according to Comparative Example 1 has a problem that an inference model cannot be readily generated when almost no training data sets are open to the public, as in the case of raw data, for instance, while there is no problem when many training data sets for training an inference model are open to the public, as in the case of RGB data, for instance.

Figure 2:
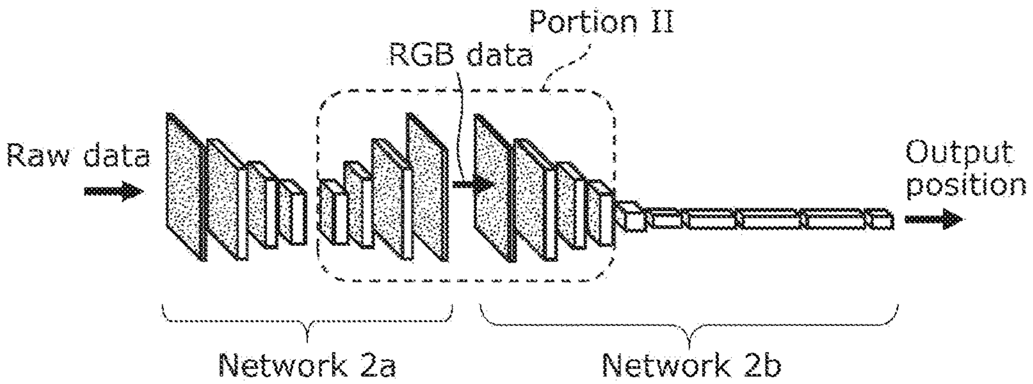
FIG. 2 illustrates an inference model according to Comparative Example 2.

FIG. 2 illustrates an inference model according to Comparative Example 2.

An inference model according to Comparative Example 2 is a model that recognizes the position of an object based on image data, for example, and is generated by simply connecting two trained networks. Specifically, the inference model according to Comparative Example 2 is generated by connecting network 2*a* that converts raw data into RGB data and network 2*b* that recognizes the position of an object based on the RGB data.

However, in the inference model according to Comparative Example 2, data transferred between the two networks, that is, networks 2*a* and 2*b*, is in the form of RGB data, and thus a layer that generates RGB data and a layer that generates data for recognizing a position from the RGB data are necessary as illustrated in portion II of FIG. 2. Accordingly, this raises a problem that redundancy is given to the inference model, and a lot of computation processing is necessary when an inference is actually conducted using the inference model.

An inference model generating method according to the present disclosure is to solve such problems, and can reduce a load applied when an inference model is generated even when a training data set for training a new inference model is not provided. Furthermore, the inference model generating method according to the present disclosure can generate an inference model having lower redundancy.

The following describes in detail embodiments of the present disclosure, with reference to the drawings. Note that the embodiments described below each show a particular example of the present disclosure. The numerical values, shapes, materials, standards, elements, the arrangement and connection of the elements, steps, the order of the steps, and others indicated in the following embodiments are examples, and are not intended to limit the present disclosure. In addition, among the elements in the following embodiments, elements not recited in any of the independent claims defining the most generic part of the concept of the present disclosure are described as optional elements. Further, the drawings do not necessarily provide strictly accurate illustration. The same numeral is given to substantially the same configuration throughout the drawings, and a redundant description is omitted or simplified.

Note that raw data in the Specification is raw image data obtained by recording optical information as it is captured by an image sensor. RGB data is image data that is generated by compressing and converting raw data and includes a combination of red, green, and blue colors. Examples of data formats of RGB data include Joint Photographic Experts Group (JPEG), Tagged-Image File Format (TIFF), CompuServe Graphics Interchange Format (GIF), and Portable Network Graphics (PNG). A domain is a group of objects when inference is made in an inference model. A training data set is a subset of a domain, and includes input data and a label associated with the input data, that are for training an inference model.

EMBODIMENT

An inference model and an inference model generating method according to an embodiment are to be described.

1. Configuration of Inference Model

First, a configuration of an inference model according to the present embodiment is to be described with reference to FIG. 3 to FIG. 5B.

Figure 3:
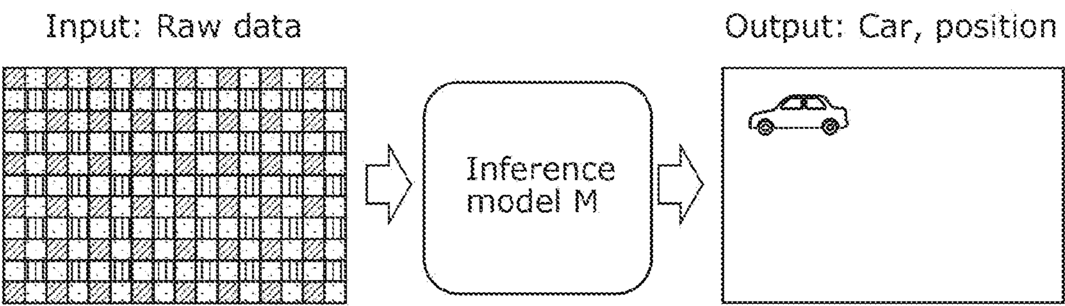
FIG. 3 illustrates an example of use of an inference model according to an embodiment.

FIG. 3 illustrates an example of use of inference model M according to the embodiment.

Inference model M is used when certain identification or classification is performed on input data. For example, if an object is a car, when raw data that includes the object is input to inference model M, the name of the object "car" and the position of the object in the image (x, y) are output from inference model M. Inference model M according to the present embodiment outputs information on an object included in an image, based on image data, for example. Information output by inference model M is not limited to the name and the position of an object, and may be, for example, a product number, a color, or a price of an object or a determination result as to whether input image data includes an object.

Figure 4:
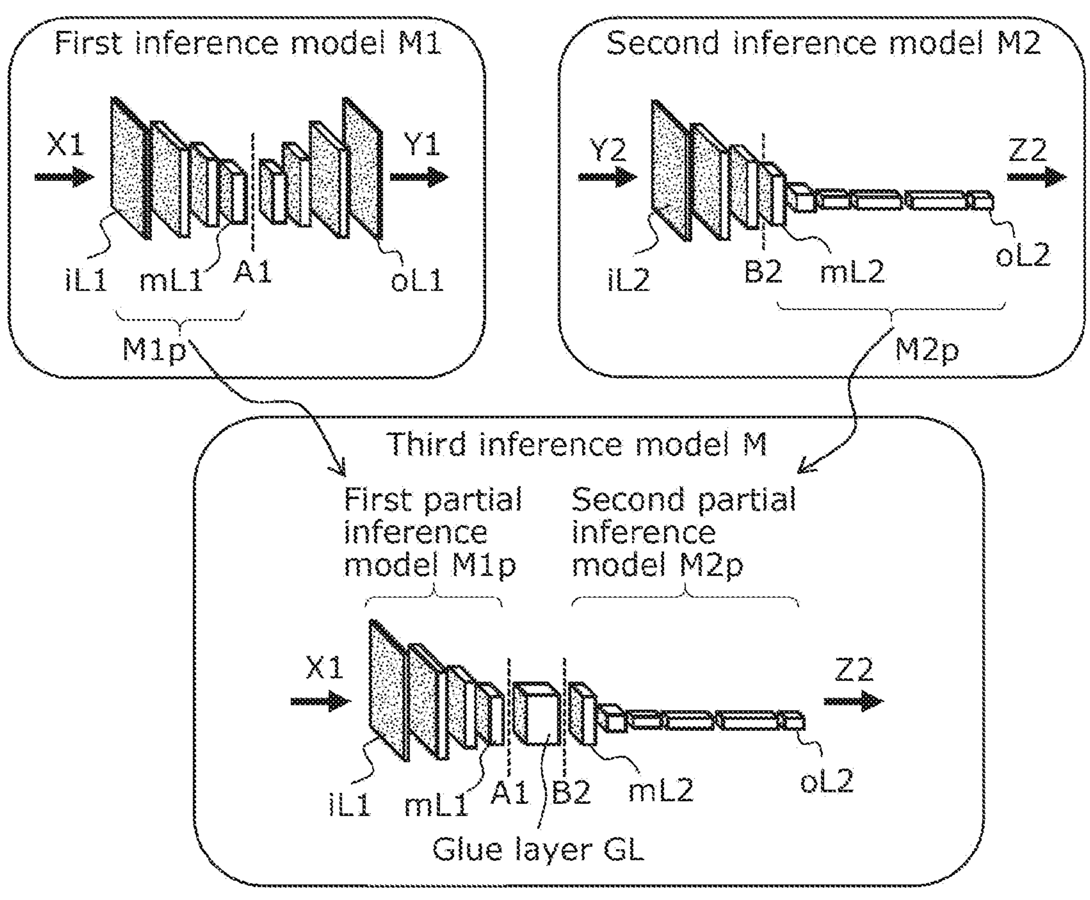
FIG. 4 illustrates the inference model according to the embodiment.

FIG. 4 illustrates inference model M according to the embodiment. Note that FIG. 4 also illustrates first inference model M1 and second inference model M2 for generating inference model M.

The inference models each include a neural network. The inference models each have a multilayer structure, and include an input layer, intermediate layers, and an output layer, for instance. Each layer has a plurality of nodes (not illustrated) corresponding to neurons.

As illustrated in FIG. 4, inference model M includes first partial inference model M1*p* that is a portion of first inference model M1, second partial inference model M2*p* that is a portion of second inference model M, and glue layer GL located between first partial inference model M1*p* and second partial inference model M2*p*. Thus, inference model M is third inference model M generated using first inference model M1 and second inference model M2.

First inference model M1 includes input layer iL1, a plurality of intermediate layers, and output layer oL1 arranged in the forward direction. First inference model M1 has a symmetrical structure that includes an encoder-decoder structure. First inference model M1 has been trained using a training data set that includes input data X1 and output data Y1 that is a label associated with input data X1.

First partial inference model M1*p* includes a portion of first inference model M1 from input layer iL1 through predetermined intermediate layer mL1. Predetermined intermediate layer mL1 is the smallest in size among the plurality of intermediate layers of first inference model M1. A layer being small in size means that the layer contains less nodes. In this manner, first partial inference model M1*p* is generated by extracting a portion of first inference model M1 from input layer iL1 through predetermined intermediate layer mL1.

Second inference model M2 includes input layer iL2, a plurality of intermediate layers, and output layer oL2 arranged in the forward direction. Second inference model M2 has an asymmetrical structure different from the encoder-decoder structure. Second inference model M2 has been trained using a training data set that includes input data Y2 and output data Z2 that is a label associated with input data Y2.

Note that the training data set for training second inference model M2 is different from the training data set for training first inference model M1. Thus, a domain that is a group of objects when first inference model M1 is inferred is different from a domain that is a group of objects when second inference model M2 is inferred.

On the other hand, a type of output data Y1 that is output from first inference model M1 is the same as a type of input data Y2 that is input to second inference model M2. When image data is used as an example, examples of the same type of data of course include image data having the same data format, and also include image data that have different data formats such as JPEG, TIFF, GIF, and PNG but can be read by the same software. In this respect, RGB data and raw data are different types of image data.

As illustrated in FIG. 4, second partial inference model M2*p* includes a portion of second inference model M2 from predetermined intermediate layer mL2 through output layer oL2. Predetermined intermediate layer mL2 is an intermediate layer most distant from input layer iL2 of second inference model M2 in the multilayer structure, out of one or more intermediate layers each resulting in an error less than or equal to a threshold, which occurs between input and output, when layers from input layer iL2 through one of the plurality of intermediate layers are flipped by an autoencoder to reconstruct layers from input layer iL2 through an output layer, as will be later described with reference to FIG. 9. In this manner, second partial inference model M2*p* is generated by extracting a portion of second inference model M2 from predetermined intermediate layer mL2 through output layer oL2. Note that an autoencoder is a known algorithm for dimension reduction, using a neural network in machine learning.

Glue layer GL connects predetermined intermediate layer mL1 included in first partial inference model M1*p* and predetermined intermediate layer mL2 included in second partial inference model M2*p*. For example, glue layer GL is a convolution layer that converts output data that is output from first partial inference model M1*p* into input data that is input to second partial inference model M2*p* or is a fully connected layer.

More specifically, glue layer GL has a function of mapping intermediate representation A1 of first inference model M1 into intermediate representation B2 of second inference model M2. Here, an intermediate representation is an internal representation of an inference model, and means output from a layer that is produced between two layers adjacent to each other. In the present embodiment, intermediate representation A1 of first inference model M1 is produced at the boundary of the encoder-decoder structure, that is, between predetermined intermediate layer mL1 and an intermediate layer located adjacent to predetermined intermediate layer mL1 in the forward direction. Intermediate representation B2 of second inference model M2 is produced between predetermined intermediate layer mL2 and an intermediate layer located adjacent to predetermined intermediate layer mL2 in the direction opposite the forward direction.

Figure 5A:
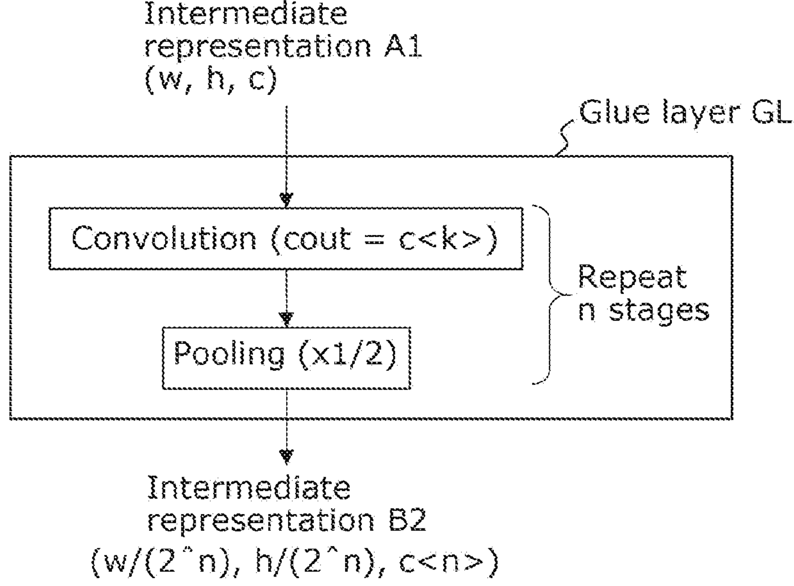
FIG. 5A illustrates an example of a glue layer of the inference model according to the embodiment.

FIG. 5A illustrates an example of glue layer GL of inference model M.

The aspect of glue layer GL on the input side and the aspect thereof on the output side are determined based on the tensor shapes of intermediate representations A1 and B2. Glue layer GL includes a convolution layer and a pooling layer. FIG. 5A illustrates an example in which convolution and pooling are repeated n stages (n is an integer of one or more). A pooling layer is for eliminating difference if intermediate representations A1 and B2 have different tensor sizes (for example, width, height, and channel).

Figure 5B:
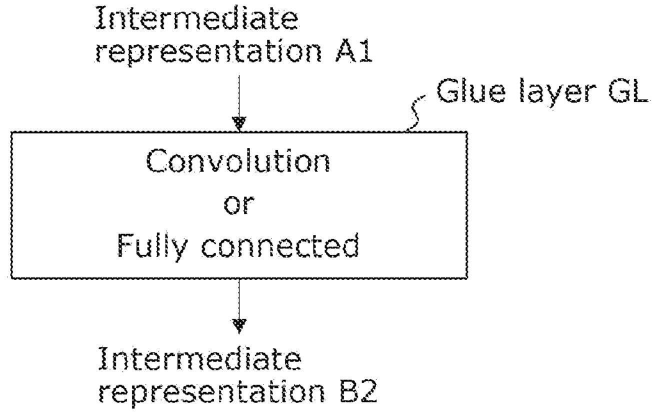
FIG. 5B illustrates another example of the glue layer of the inference model according to the embodiment.

FIG. 5B illustrates another example of glue layer GL of inference model M. As illustrated in FIG. 5B, glue layer GL may be only one of a convolution layer and a fully connected layer.

Glue layer GL is not yet trained immediately after being disposed between first partial inference model M1*p* and second partial inference model M2*p*, and undergoes training through a training step described later. Note that glue layer GL does not need to be untrained immediately after being disposed between first partial inference model M1*p* and second partial inference model M2*p*, and may be already trained then.

As described above, inference model M according to the present embodiment includes a portion of first inference model M1 trained and a portion of second inference model M2 trained, and thus a load applied when inference model M is generated can be reduced. Inference model M according to the present embodiment includes not all but portions of trained inference models, and thus an inference model having low redundancy can be achieved.

2. Hardware Configuration of Inference Model Generating Apparatus

Next, a hardware configuration of an inference model generating apparatus that generates inference model M according to the present embodiment is to be described with reference to FIG. 6.

Figure 6:
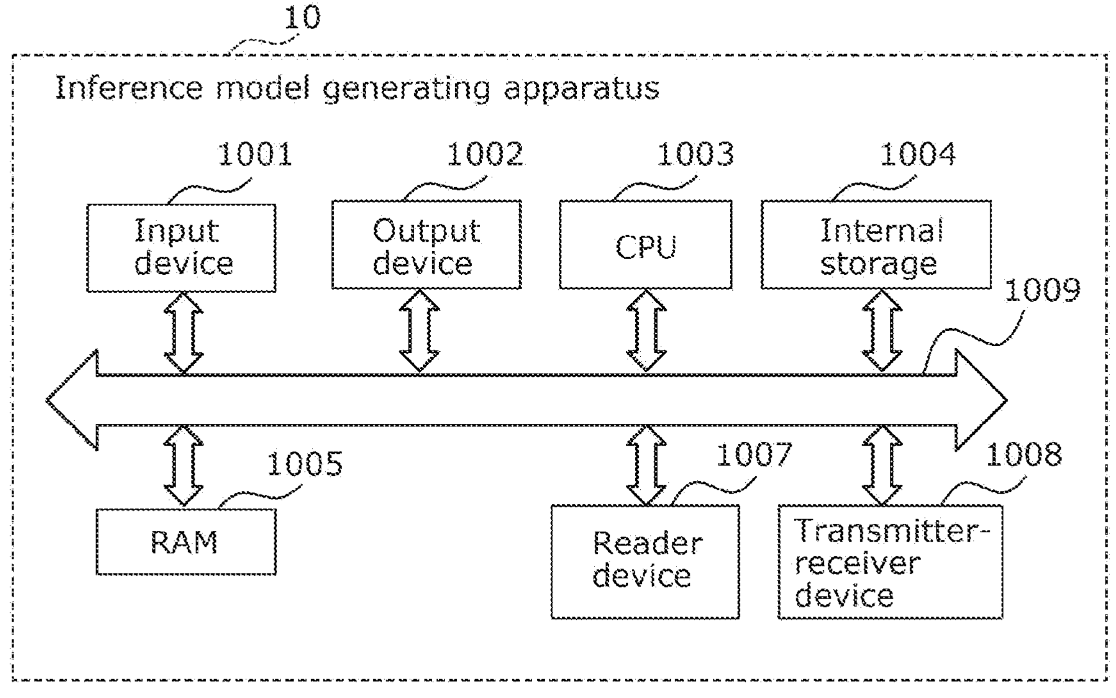
FIG. 6 illustrates an example of a hardware configuration that achieves functions of an inference model generating apparatus according to the embodiment using software.

FIG. 6 illustrates an example of a hardware configuration of a computer that achieves functions of inference model generating apparatus 10 using software.

As illustrated in FIG. 6, inference model generating apparatus 10 is a computer that includes input device 1001, output device 1002, central processing unit (CPU) 1003, internal storage 1004, RAM 1005, reader device 1007, transmitter-receiver device 1008, and bus 1009. Input device 1001, output device 1002, CPU 1003, internal storage 1004, RAM 1005, reader device 1007, and transmitter-receiver device 1008 are connected via bus 1009.

Input device 1001 is a device that serves as a user interface such as a touch pad or a touch panel display, and receives user operation. For example, input device 1001 receives input data X1 when inference model M is executed. Note that input device 1001 may be configured to receive a voice operation and/or a remote operation using a remote control, for instance, in addition to a touch operation made by a user.

Output device 1002 is a device that also serves as input device 1001, is configured of a touch pad or a touch panel display, and notifies a user of information that the user is to be informed of. For example, output device 1002 notifies a user of a name and a position of an object, for instance, when inference model M is executed.

Internal storage 1004 is a flash memory, for instance. Internal storage 1004 may prestore therein at least one of a program for achieving functions of inference model generating apparatus 10 or an application that uses a functional configuration of inference model generating apparatus 10. Internal storage 1004 may store therein untrained or trained inference model M. Internal storage 1004 may store therein the autoencoder described above.

RAM 1005 is random access memory and is used to store, for instance, data when a program or an application is executed.

Reader device 1007 reads information from a recording medium such as a universal serial bus (USB) memory. From a recording medium on which a program and an application as mentioned above are recorded, reader device 1007 reads the program and the application, and stores the program and the application into internal storage 1004. For example, reader device 1007 reads, from the recording medium, first inference model M1, second inference model M2, and glue layer GL, for instance. Reader device 1007 may read a training data set from the recording medium.

Transmitter-receiver device 1008 is a communication circuit for wireless or wired communication. Transmitter-receiver device 1008 communicates with, for example, a server device connected to a network, downloads a program and an application as above from the server device, and stores the program and the application into internal storage 1004. Transmitter-receiver device 1008 may receive a training data set used for training from a social networking service (SNS), for instance.

CPU 1003 is a central processing unit, copies into RAM 1005 a program and an application stored in internal storage 1004, and sequentially reads from RAM 1005 and executes instructions included in the program and the application. For example, CPU 1003 generates inference model M based on first inference model M1, second inference model M2, and glue layer GL obtained from reader device 1007. CPU 1003 trains inference model M, based on a training data set obtained by reader device 1007 or transmitter-receiver device 1008.

3. Method for Generating Inference Model

Next, a method for generating inference model M according to the present embodiment is to be described with reference to FIG. 7 to FIG. 11.

Figure 7:
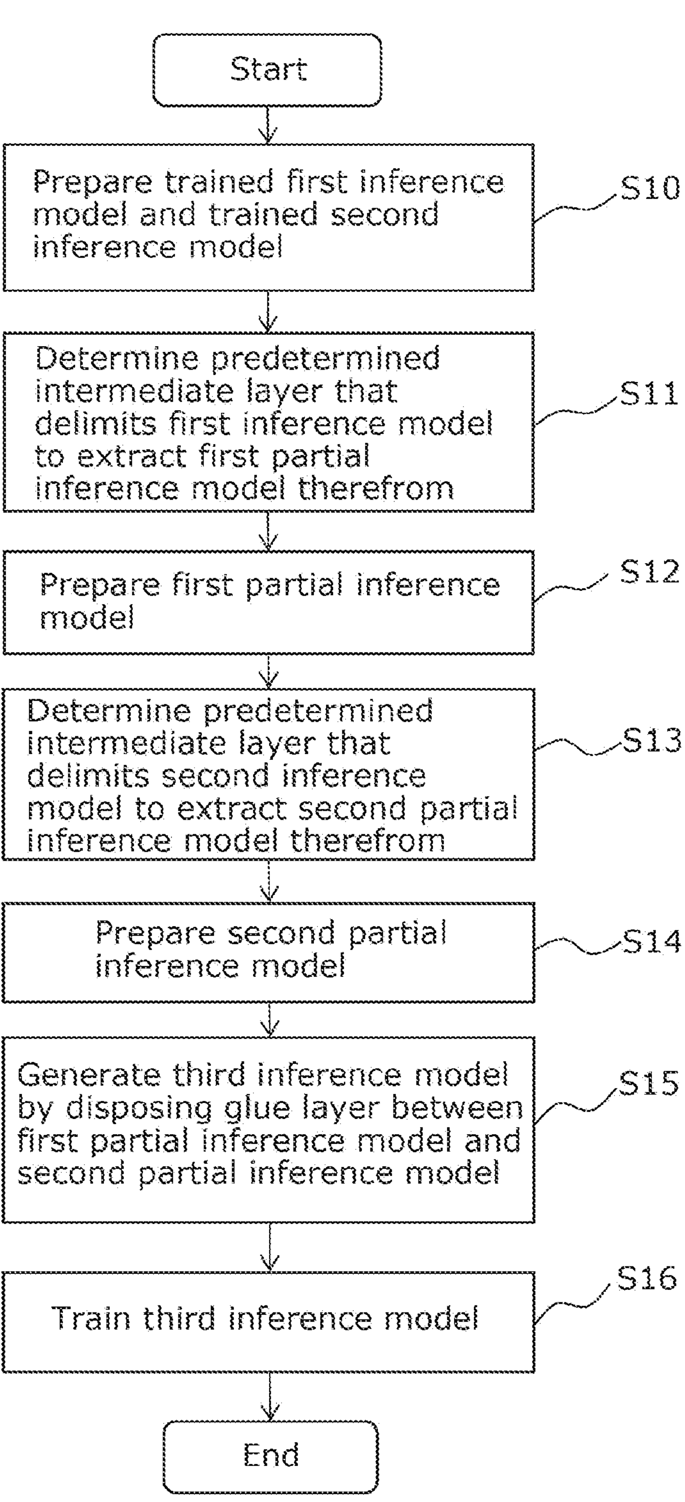
FIG. 7 is a flowchart illustrating a method for generating the inference model according to the embodiment.

FIG. 7 is a flowchart illustrating a method for generating inference model M according to the embodiment.

First, inference model generating apparatus 10 prepares trained first inference model M1 and trained second inference model M2 (step S10). First inference model M1 and second inference model M2 have been trained using different domains. Inference model generating apparatus 10 may obtain first inference model M1 and second inference model M2 using reader device 1007 or by training the models by itself.

Next, inference model generating apparatus 10 determines predetermined intermediate layer mL1 that delimits first inference model M1 to extract first partial inference model M1*p* therefrom (step S11).

Figure 8:
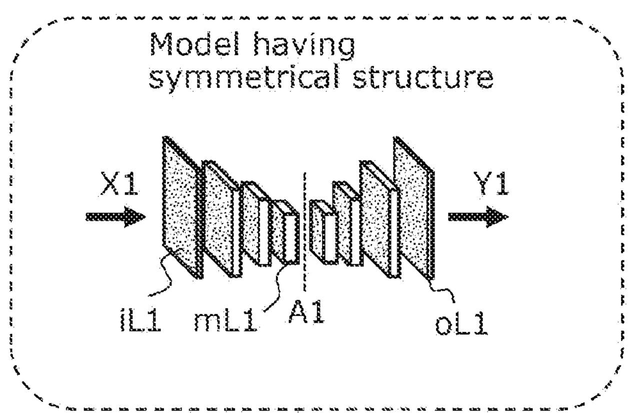
FIG. 8 illustrates a step for determining a predetermined intermediate layer that delimits a first inference model to extract a first partial inference model therefrom.

FIG. 8 illustrates a step for determining predetermined intermediate layer mL1 that delimits first inference model M1 to extract first partial inference model M1*p* therefrom.

This step is for determining, as predetermined intermediate layer mL1, an intermediate layer having the smallest size among intermediate layers of first inference model M1, that is, an intermediate layer having the most compressed information. When first inference model M1 has a symmetrical structure, two intermediate layers have the smallest size, yet one of the two intermediate layers may be determined as predetermined intermediate layer mL1. Note that in order to decrease the number of layers of first partial inference model M1*p*, an intermediate layer located closer to input layer iL1 out of the two intermediate layers may be determined as predetermined intermediate layer mL1. Typically, a layer having less nodes in a neural network structure is assumed to hold higher-dimensional information (a principal component that represents and expresses input data) out of information items on input data of the network, and thus even if a layer that holds higher-dimensional information for another reason is selected as an intermediate layer instead of a layer having the smallest size, the nature of the present disclosure does not change.

Next, inference model generating apparatus 10 prepares first partial inference model M1*p* (step S12). Specifically, a portion of first inference model M1 from input layer iL1 through predetermined intermediate layer mL1 is extracted from first inference model M1, to generate first partial inference model M1*p*.

Next, inference model generating apparatus 10 determines predetermined intermediate layer mL2 that delimits second inference model M2 to extract second partial inference model M2*p* therefrom (step S13).

Figure 9:
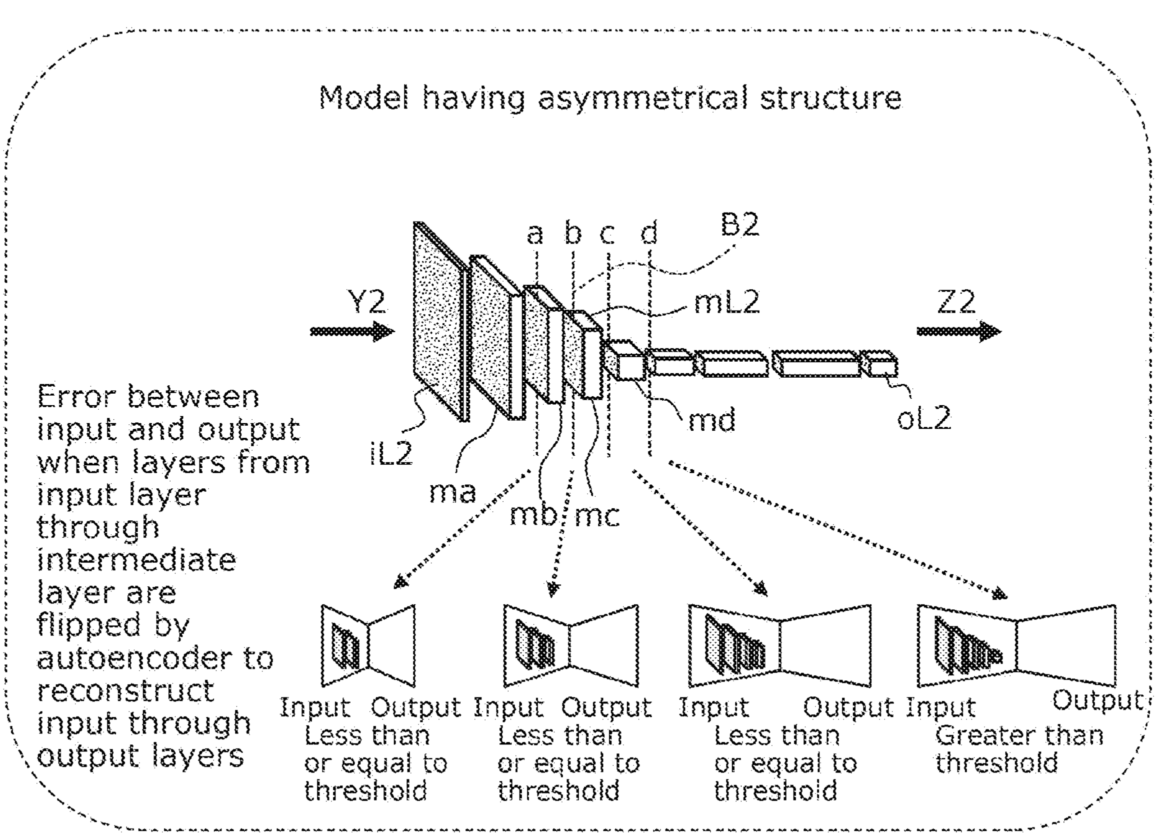
FIG. 9 illustrates a step for determining a predetermined intermediate layer that delimits a second inference model to extract a second partial inference model therefrom.

FIG. 9 illustrates a step for determining predetermined intermediate layer mL2 that delimits second inference model M2 to extract second partial inference model M2*p* therefrom.

In this step, first, out of intermediate layers of second inference model M2, one or more intermediate layers each resulting in an error less than or equal to a threshold, which occurs between input and output, when layers from input layer iL2 through one of the intermediate layers are flipped by an autoencoder to reconstruct layers from input layer iL2 through an output layer are obtained. The autoencoder is used to find out, by compressing and decompressing information, the highest degree of compression for reproducing the lowest limit of the information. FIG. 9 illustrates an example in which layers from input layer iL2 through intermediate layers ma, mb, mc, and md are flipped over flipping points a, b, c, and d corresponding thereto, respectively. As illustrated in FIG. 9, errors between input and output of intermediate layers ma, mb, and mc are less than or equal to the threshold, and thus intermediate layers ma to mc are candidates for predetermined intermediate layer mL2. In determining predetermined intermediate layer mL2 out of intermediate layers ma to mc that are candidates, intermediate layer mc that is most distant from input layer iL2 is determined as predetermined intermediate layer mL2, in order to decrease the number of layers of second partial inference model M2*p* herein. Intermediate layer mc that is most distant is an intermediate layer having the smallest size, that is, having most compressed information out of intermediate layers ma to mc. Note that the threshold of an error between input and output is determined as appropriate according to second inference model M2. The step here shows an example in which predetermined intermediate layer mL2 is determined by identifying an intermediate layer having the lowest limit of information in second inference model M2, using an autoencoder that is a technique for compressing information (extracting a principal component), and this is equivalent to identifying an intermediate layer having a higher-dimensional information (a principal component that represents and expresses input data) out of information items on input data of the network. Even if a predetermined intermediate layer is determined by identifying capabilities of intermediate layers to hold higher-dimensional information using other methods, the nature of the preset disclosure does not change.

Next, inference model generating apparatus 10 prepares second partial inference model M2*p* (step S14). Specifically, a portion of second inference model M2 from predetermined intermediate layer mL2 through output layer oL2 is extracted from second inference model M2, to generate second partial inference model M2*p*. Note that steps S13 and S14 may be executed prior to steps S11 and S12.

Next, inference model generating apparatus 10 generates third inference model M by disposing glue layer GL between first partial inference model M1*p* and second partial inference model M2*p* (step S15). Inference model M at this stage is still untrained.

Next, inference model generating apparatus 10 trains third inference model M (step S16).

Figure 10A:
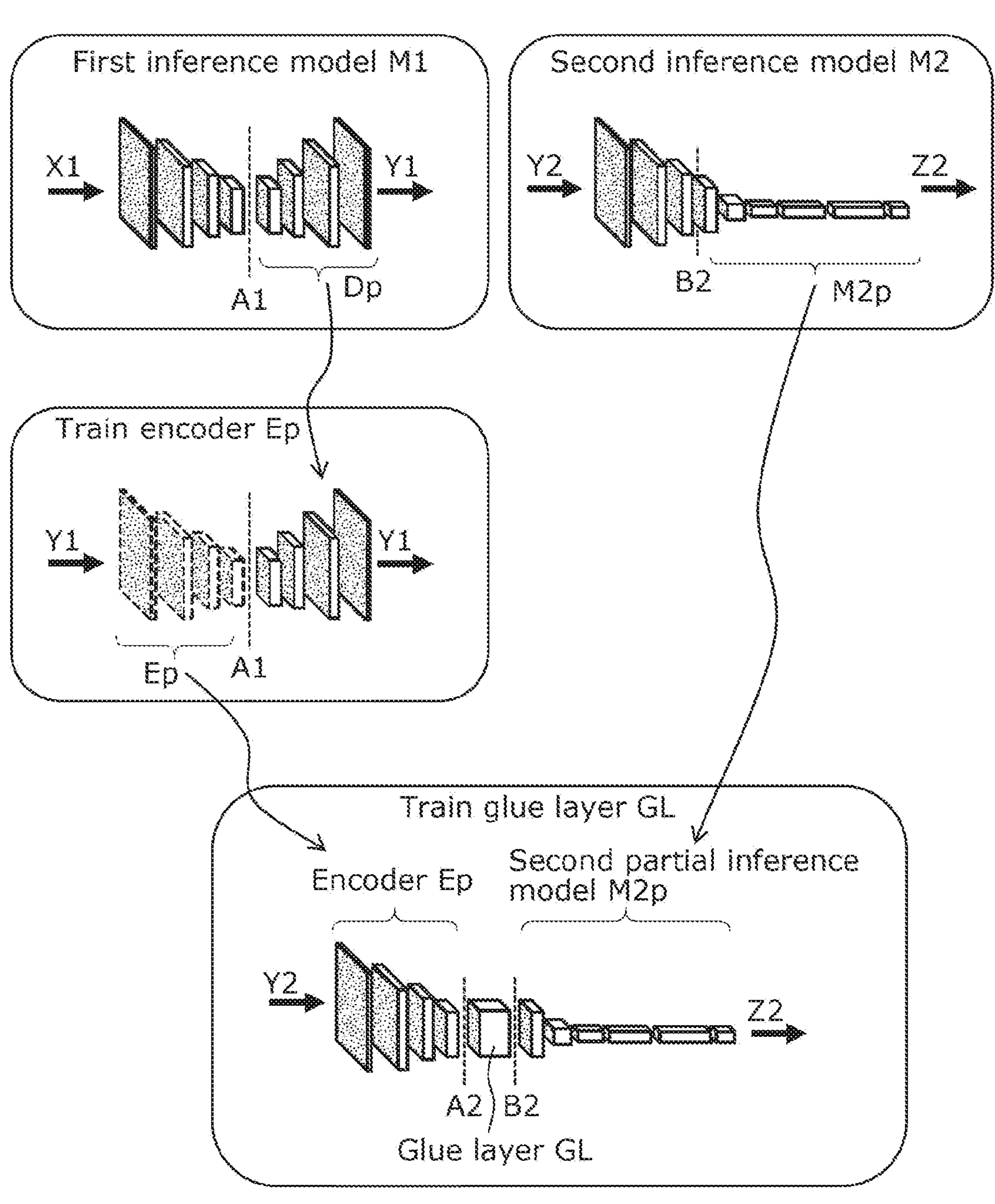
FIG. 10A illustrates an example of a step of training the inference model.

FIG. 10A illustrates an example of a step of training inference model M. An example of training glue layer GL is to be described with reference to FIG. 10A.

Raw data is input to input layer iL1 of inference model M, yet if a training data set of raw data that is used for training inference model M is not open to the public, it is difficult to train glue layer GL by inputting raw data to inference model M. In view of this, new encoder Ep is generated to train glue layer GL.

Encoder Ep is generated to have an inverse function that is a reversed function of a function of decoder Dp of first inference model M1. Specifically, decoder Dp is extracted from first inference model M1, and encoder Ep is disposed facing decoder Dp. Encoder Ep is trained, using the autoencoder, so that data Y1 is input to encoder Ep and furthermore data Y1 is output from decoder Dp. RGB data used for training first inference model M1 is used for data Y1 to be learned.

Note that encoder Ep may be generated as below, using the idea of distillation.

Figure 10B:
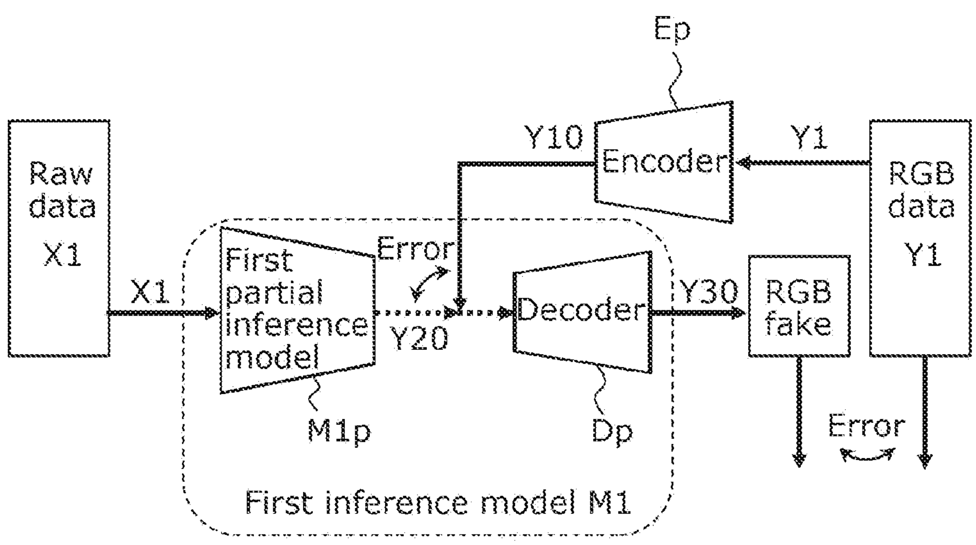
FIG. 10B illustrates another example of a step of training the inference model.

FIG. 10B illustrates another example of a step of training inference model M. An example in which encoder Ep is trained as a distillation model is to be described with reference to FIG. 10B.

As illustrated in FIG. 10B, a pair of raw data X1 and RGB data Y1 as a training data set and first inference model M1 are prepared. RGB data Y1 is input to untrained encoder Ep, and first intermediate data (hereinafter referred to as first data) Y10 that is output from encoder Ep is obtained. On the other hand, raw data X1 whose label data is RGB data Y1 is input to first partial inference model M1*p* of first inference model M1, and second intermediate data (hereinafter, referred to as second data) Y20 immediately before being input to decoder Dp is obtained. At this time, encoder Ep is trained so that an error between first data Y10 and second data Y20 is reduced. Furthermore, encoder Ep is trained so that an error between RGB data Y1 and output (third data Y30) from decoder Dp when first data Y10 is input to decoder Dp is reduced. Here, RGB fake in FIG. 10B is equivalent to third data Y30 due to being an image equivalent to RGB data Y1 included in a data set, but is stated as RGB fake in the sense that it is created "fake" RGB data.

Note that distillation is to train a new and simple model (a distillation model: Ep) using input and output of an already trained model as they are, and a configuration herein is to use intermediate data of a trained model, rather than input and output of an already trained model as they are. Here, ideally, when first data Y10 that is output from encoder Ep is equal to second data Y20 and third data Y30 that is output from decoder Dp is equal to Y1 that is input to encoder Ep, encoder Ep is in a state of having an inverse function that is a reversed function of a function of decoder Dp. Practically, when the two errors therebetween fall within a predetermined range, a function equivalent to an inverse function that is a reversed function of a function of decoder Dp is substantially obtained.

Next, trained encoder Ep is disposed on the input side of glue layer GL, and glue layer GL is trained using a training data set according to input and output of glue layer GL. Specifically, data Y2 that is RGB data used for training second inference model M2 is input to encoder Ep, and intermediate representation A2 output from encoder Ep is input to glue layer GL. Glue layer GL is trained by being taught that output from glue layer GL is to be intermediate representation B2 corresponding to the input to second partial inference model M2*p*. After training ends, encoder Ep is replaced with first partial inference model M1*p* to generate trained inference model M.

Figure 11:
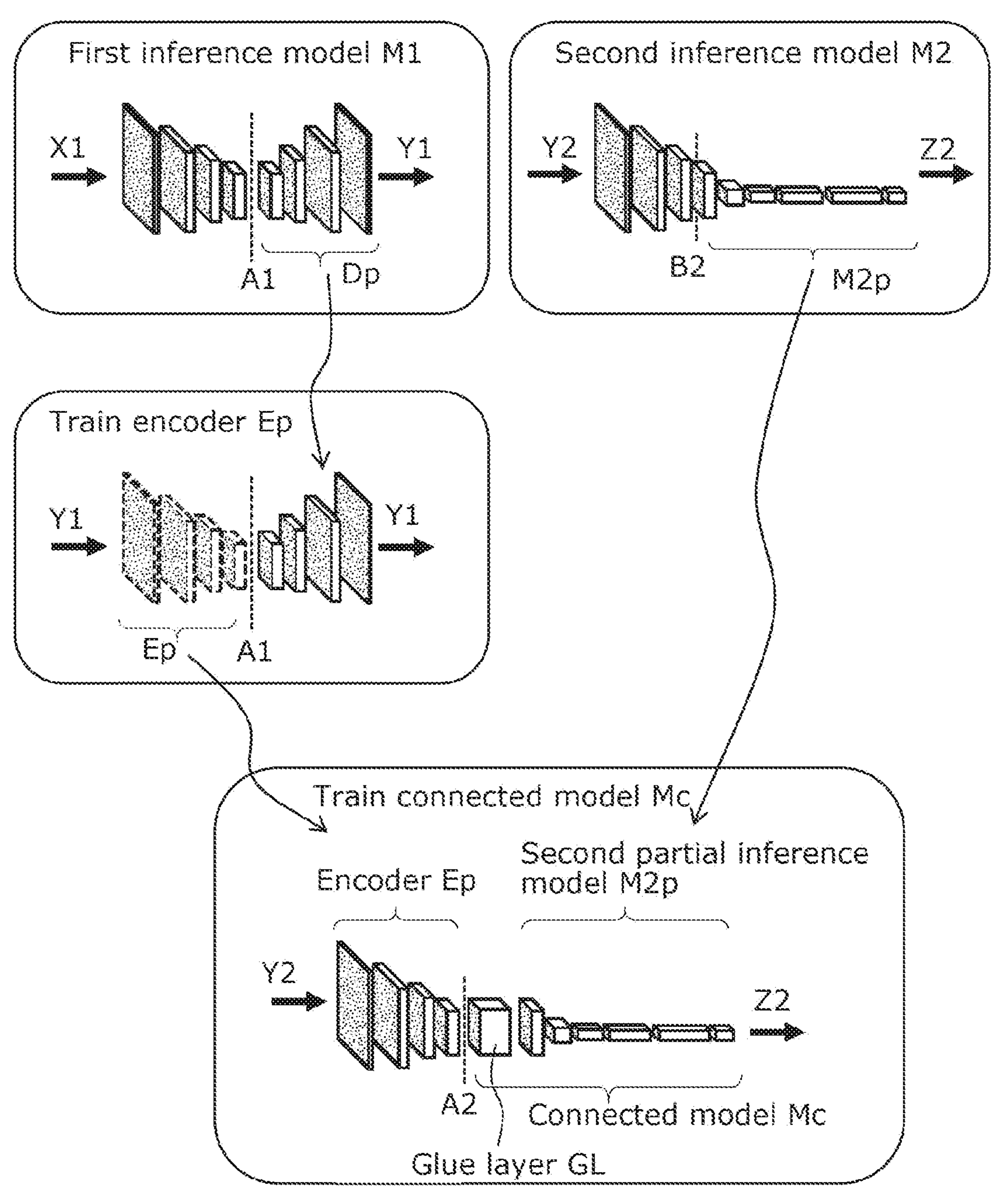
FIG. 11 illustrates another example of training the inference model.

Note that a step of training inference model M is not limited to the above, and a method described below may be adopted. FIG. 11 illustrates another example of a step of training inference model M.

FIG. 11 illustrates an example of training connected model Mc obtained by connecting glue layer GL and second partial inference model M2*p*. Specifically, trained encoder Ep is disposed on the input side of glue layer GL, similarly to FIG. 10A, and connected model Mc is trained using a training data set according to input and output of connected model Mc. More specifically, data Y2 that is RGB data is input to encoder Ep, and intermediate representation A2 output from encoder Ep is input to glue layer GL. Then, connected model Mc is trained by being taught that output of second partial inference model M2*p* is to be output data Z2. After training ends, encoder Ep is replaced with first partial inference model M1*p* to generate trained inference model M.

Note that encoder Ep in FIG. 10A and FIG. 11 may mathematically construct an inverse function instead of constructing an inverse function through training using an autoencoder. For example, kernel matrices of convolution and deconvolution may be in a relation of the transpose of the matrices under a particular condition, and thus if the condition is satisfied, the transpose of matrices may be used. As another example, when a function can be expressed by a matrix, an inverse function may be expressed by obtaining an inverse matrix or a pseudo inverse matrix. As described above, a method for generating inference model M according to the present embodiment includes a step of preparing a portion of trained first inference model M1 and a step of preparing a portion of trained second inference model M2, and thus a load applied when inference model M is generated can be reduced.

4. Advantageous Effects and Others

An inference model generating method according to an aspect of the present disclosure is a method for generating third inference model M using first inference model M1 and second inference model M2, when a type of output data Y1 that is output from first inference model M1 is the same as a type of input data Y2 that is input to second inference model M2, first inference model M1 and second inference model M2 each being trained and having a multilayer structure. The method for generating inference model M includes: preparing first partial inference model M1*p* that includes a portion of first inference model M1 from input layer iL1 through predetermined intermediate layer mL1; preparing second partial inference model M2*p* that includes a portion of second inference model M2 from predetermined intermediate layer mL2 through output layer oL2; and generating third inference model M by disposing glue layer GL between first partial inference model M1*p* and second partial inference model M2*p*, glue layer GL connecting predetermined intermediate layer mL1 of first inference model M1 and predetermined intermediate layer mL2 of second inference model M2.

As stated above, the method for generating inference model M includes preparing first partial inference model M1*p* that is a portion of trained first inference model M1, and preparing second partial inference model M2*p* that is a portion of trained second inference model M2, and thus a load applied when inference model M is generated can be reduced.

A domain that is a group of objects when first inference model M1 is inferred may be different from a domain that is a group of objects when second inference model M2 is inferred.

As stated above, even if the domain for first inference model M1 and the domain for second inference model M2 are different from each other, a load applied when inference model M is generated can be reduced by disposing glue layer GL between first partial inference model M1*p* and second partial inference model M2*p*.

The data of the same type may be image data.

As stated above, output data Y1 of first inference model M1 and input data Y2 of second inference model M2 are image data that is data of the same type, and thus a load applied when inference model M is generated using image data can be reduced.

Glue layer GL disposed in generating third inference model M may be untrained.

According to the method for generating inference model M, even if glue layer GL is untrained, a load applied when inference model M is generated can be reduced.

The method for generating inference model M may further include: determining predetermined intermediate layer mL1 of first inference model M1 before preparing first partial inference model M1*p*. Predetermined intermediate layer mL1 of first inference model M1 determined in the determining may be an intermediate layer that expresses a principal component of input data that is input to first inference model M1, out of a plurality of intermediate layers included in first inference model M1.

As stated above, predetermined intermediate layer mL1 of first inference model M1 is determined, and thus first partial inference model M1*p* can be readily generated. Accordingly, a load applied when inference model M is generated can be reduced.

The method for generating inference model M may further include: determining predetermined intermediate layer mL2 of second inference model M2 before preparing second partial inference model M2*p*. Predetermined intermediate layer mL2 of second inference model M2 determined in the determining may be one of one or more intermediate layers each resulting in an error less than or equal to a threshold, when layers from input layer iL2 of second inference model M2 through one of a plurality of intermediate layers ma to and included in second inference model M2 are flipped by an autoencoder to reconstruct layers from input layer iL2 through an output layer, the one or more intermediate layers being included in the plurality of intermediate layers ma to md, the error being a difference between input and output.

As stated above, predetermined intermediate layer mL2 of second inference model M2 is determined, and thus second partial inference model M2*p* can be readily generated. Accordingly, a load applied when inference model M is generated can be reduced.

Out of the one or more intermediate layers each resulting in the error less than or equal to the threshold, an intermediate layer most distant from input layer iL2 of second inference model M2 in the multilayer structure may be determined as predetermined intermediate layer mL2 of second inference model M2.

As stated above, predetermined intermediate layer mL2 of second inference model M2 is determined, and thus second partial inference model M2*p* can be readily generated. Accordingly, a load applied when inference model M is generated can be reduced.

Glue layer GL may include one of or a combination of two or more of: a convolution layer that converts output data Y1 that is output from first partial inference model M1*p* into input data Y2 that is input to second partial inference model M2*p*; a pooling layer; and a fully connected layer.

As stated above, glue layer GL that converts output data Y1 of first partial inference model M1*p* into input data Y2 of second partial inference model M2*p* can be readily generated. Accordingly, a load applied when inference model M is generated can be reduced.

The method for generating inference model M may further include: training third inference model M.

As stated above, the method includes training third inference model M, and thus trained inference model M can be readily generated.

The training may include training glue layer GL using a training data set according to input and output of glue layer GL.

According to this, glue layer GL can be readily trained, and thus trained inference model M can be readily generated.

A plurality of output data that are output from first inference model M1 may be input, as input data, to an inverse-function model having a reversed function of a function of a portion of first inference model M1 from predetermined intermediate layer mL1 through an output layer, and a plurality of output data that are output from the inverse-function model may be used as an input data set in the training data set.

The inverse-function model may be one of: an inference model mathematically constructed by arranging, in reverse order, all layers located downstream of predetermined intermediate layer mL1 of first inference model M1, using the output layer as an input layer; and an inference model obtained by constructing an autoencoder using all layers located downstream of predetermined intermediate layer mL1 of first inference model M1, and training the autoencoder using the plurality of output data that are output from first inference model M1.

The inverse-function model may be a distillation model, and the distillation model may be an inference model obtained by being trained to reduce an error between first data Y10 and second data Y20, first data Y10 being output data obtained when label data Y1 in a training data set for first inference model M1 is input to the distillation model, second data Y20 being output data obtained when input data X1 paired with the label data is input to first partial inference model M1*p* that is the portion of first inference model M1 up to the predetermined intermediate layer, input data X1 paired with the label data being included in the training data set for first inference model M1.

The distillation model may be an inference model obtained by further being trained to reduce an error between third data Y30 and label data Y1, third data Y30 being output data obtained when second data Y20 is input to a model (decoder Dp) located downstream of the predetermined intermediate layer of first inference model M1.

A plurality of input data for second inference model M2 may be input to second inference model M2, and a plurality of inference data resulting from the plurality of input data being input may be used as an output data set in the training data set.

The training may include training connected model Mc using a training data set according to input and output of connected model Mc, connected model Mc being obtained by connecting glue layer GL and second partial inference model M2*p*.

According to this, connected model Mc can be readily trained, and thus trained inference model M can be readily generated.

A plurality of output data that are output from first inference model M1 may be input, as input data, to an inverse-function model having a reversed function of a function of a portion of first inference model M1 from predetermined intermediate layer mL1 through an output layer, and a plurality of output data that are output from the inverse-function model may be used as an input data set in the training data set.

The inverse-function model may be one of: an inference model mathematically constructed by arranging, in reverse order, all layers located downstream of predetermined intermediate layer mL1 of first inference model M1, using the output layer as an input layer; and an inference model obtained by constructing an autoencoder using all layers located downstream of predetermined intermediate layer mL1 of first inference model M1, and training the autoencoder using the plurality of output data that are output from first inference model M1.

A plurality of input data for second inference model M2 may be input to second inference model M2, and a plurality of inference data resulting from the plurality of input data being input may be used as an output data set in the training data set.

Inference model M according to an aspect of the present disclosure includes: first partial inference model M1*p* that is a portion of first inference model M1 that has been trained; second partial inference model M2*p* that is a portion of second inference model M2 that has been trained; and glue layer GL disposed between first partial inference model M1*p* and second partial inference model M2*p*, glue layer GL being untrained. First partial inference model M1*p* includes a portion of first inference model M1 from input layer iL1 through predetermined intermediate layer mL1, second partial inference model M2*p* includes a portion of second inference model M2 from predetermined intermediate layer mL2 through output layer oL2, and glue layer GL connects predetermined intermediate layer mL1 included in first partial inference model M1*p* to predetermined intermediate layer mL2 included in second partial inference model M2*p*.

As stated above, inference model M includes a portion of first inference model M1 trained and a portion of second inference model M2 trained, and thus a load applied when inference model M is generated can be reduced. Inference model M includes not all but portions of trained inference models, and thus an inference model having low redundancy can be achieved.

A type of data Y1 that is output from first partial inference model M1*p* and input to glue layer GL may be the same as a type of data Y2 that is output from glue layer GL and input to second partial inference model M2*p*.

As stated above, a type of output data Y1 of first inference model M1 is the same as a type of input data Y2 of second inference model M2, and thus a load applied when inference model M is generated can be reduced.

OTHER EMBODIMENTS

The above has described the inference model generating method according to the present disclosure based on the embodiments, yet the present disclosure is not limited to such embodiments. The scope of the present disclosure includes various modifications to the embodiments, which may be conceived by those skilled in the art or forms constructed by combining some elements in the embodiments, without departing from the gist of the present disclosure.

For example, the above embodiments have shown an example in which input data that is input to inference model M is raw data, but the input data is not limited thereto and may be RGB data.

Further, the embodiments as below may be included in the scope of one or more aspects of the present disclosure.

(1) One or more of the elements included in the inference model generating apparatus may be included in a computer system that includes a microprocessor, a ROM, a RAM, a hard disk unit, a display unit, a keyboard, a mouse, and the like. A computer program is stored in the RAM or the hard disk unit. The microprocessor achieves its function by operating in accordance with the computer program. Here, the computer program includes a combination of instruction codes indicating instructions to a computer in order to achieve predetermined functions.

(2) One or more of the elements included in the inference model generating apparatus described above may be included in a single system large scale integration (LSI: large scale integrated circuit). The system LSI is a super multi-function LSI manufactured by integrating multiple components into one chip, and is specifically a computer system configured so as to include a microprocessor, a ROM, a RAM, and so on. A computer program is stored in the RAM. The system LSI accomplishes its functions by the microprocessor operating in accordance with the computer program.

(3) One or more of elements included in the inference model generating apparatus described above may be included in an integrated circuit (IC) card or a single module that can be attached to or detached from the apparatus. The IC card or the module is a computer system that includes a microprocessor, a ROM, a RAM, and the like. The above super-multifunctional LSI may be included in the IC card or the module. The IC card or the module accomplishes its functions through the microprocessor operating in accordance with the computer program. This IC card or the module may have tamper resistant properties.

(4) One or more of the elements included in the inference model generating apparatus may be the above computer program or a digital signal stored in a computer-readable recording medium such as, for example, a flexible disk, a hard disk, CD-ROM, MO, DVD, DVD-ROM, DVD-RAM, Blu-ray (registered trademark) Disc (BD), or a semiconductor memory. Furthermore, such one or more of the elements may each be the above digital signal stored in such a recording medium.

One or more of the elements included in the inference model generating apparatus may transmit the computer program or the digital signal via, for instance, data broadcasting or a network typified by electric telecommunication lines, wireless or wired communication lines, and the Internet.

(5) The present disclosure may be a method described above. Further, the present disclosure may be a computer program that achieves the method using a computer, or may be a digital signal that includes the computer program.

(6) Furthermore, the present disclosure may be a computer system that includes a microprocessor and memory, the memory has stored therein the above computer program, and the microprocessor may operate in accordance with the computer program.

(7) Furthermore, the above program or the above digital signal may be executed by another independent computer system by being recorded on the above recording medium and transferred to the system, or by being transferred to the system via the above network, for instance.

(8) The embodiments and the variations may be combined.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable to a method for generating an inference model that outputs information on an object included in an image, based on image data.

The invention claimed is:

1. A method for generating a third inference model using a first inference model and a second inference model, when a type of output data that is output from the first inference model is the same as a type of input data that is input to the second inference model, the first inference model and the second inference model each being trained and having a multilayer structure, the method comprising:

preparing a first partial inference model that includes a portion of the first inference model from an input layer of the first inference model through a predetermined intermediate layer of the first inference model;

preparing a second partial inference model that includes a portion of the second inference model from a predetermined intermediate layer of the second inference model through an output layer of the second inference model;

generating the third inference model by disposing a glue layer between the first partial inference model and the second partial inference model, the glue layer connecting the predetermined intermediate layer of the first inference model and the predetermined intermediate layer of the second inference model; and determining the predetermined intermediate layer of the second inference model before preparing the second partial inference model, wherein the predetermined intermediate layer of the second inference model determined in the determining is one of one or more intermediate layers each resulting in an error less than or equal to a threshold, the error being a difference between an input and an output of an autoencoder, the autoencoder including first layers from an input layer of the second inference model through one of a plurality of intermediate layers included in the second inference model and second layers which are the same as flipped first layers, the one or more intermediate layers being included in the plurality of intermediate layers.

2. The method according to claim 1, wherein a domain that is a group of objects when the first inference model is inferred is different from a domain that is a group of objects when the second inference model is inferred.

3. The method according to claim 1, wherein the glue layer disposed in generating the third inference model is untrained.

4. The method according to claim 1, further comprising:

determining the predetermined intermediate layer of the first inference model before preparing the first partial inference model, wherein the predetermined intermediate layer of the first inference model determined in the determining is an intermediate layer that expresses a principal component of input data that is input to the first inference model, out of a plurality of intermediate layers included in the first inference model.

5. The method according to claim 1, wherein out of the one or more intermediate layers each resulting in the error less than or equal to the threshold, an intermediate layer most distant from the input layer of the second inference model in the multilayer structure is determined as the predetermined intermediate layer of the second inference model.

6. The method according to claim 1, wherein the glue layer includes one of or a combination of two or more of:

a convolution layer that converts output data that is output from the first partial inference model into input data that is input to the second partial inference model;

a pooling layer; and a fully connected layer.

7. The method according to claim 1, further comprising:

training the third inference model.

8. The method according to claim 7, wherein the training includes training the glue layer using a training data set according to input and output of the glue layer.

9. The method according to claim 1, further comprising:

training the third inference model, wherein the training includes training a connected model using a training data set according to input and output of the connected model, the connected model being obtained by connecting the glue layer and the second partial inference model.

10. A method for generating a third inference model using a first inference model and a second inference model, when a type of output data that is output from the first inference model is the same as a type of input data that is input to the second inference model, the first inference model and the second inference model each being trained and having a multilayer structure, the method comprising:

preparing a first partial inference model that includes a portion of the first inference model from an input layer of the first inference model through a predetermined intermediate layer of the first inference model;

preparing a second partial inference model that includes a portion of the second inference model from a predetermined intermediate layer of the second inference model through an output layer of the second inference model;

generating the third inference model by disposing a glue layer between the first partial inference model and the second partial inference model, the glue layer connecting the predetermined intermediate layer of the first inference model and the predetermined intermediate layer of the second inference model; and training the third inference model, wherein:

the training includes training the glue layer using a training data set according to input and output of the glue layer, a plurality of output data that are output from the first inference model are input, as input data, to an inverse-function model having a reversed function of a function of a portion of the first inference model from the predetermined intermediate layer of the first inference model through an output layer of the first inference model, and a plurality of output data that are output from the inverse-function model are used as an input data set in the training data set.

11. The method according to claim 10, wherein the inverse-function model is one of:

an inference model mathematically constructed by arranging, in reverse order, all layers located downstream of the predetermined intermediate layer of the first inference model, using the output layer of the first inference model as an input layer of the inverse-function model; and an inference model obtained by constructing an autoencoder using all layers located downstream of the predetermined intermediate layer of the first inference model, and training the autoencoder using the plurality of output data that are output from the first inference model.

12. The method according to claim 10, wherein the inverse-function model is a distillation model, and the distillation model is an inference model obtained by being trained to reduce an error between first data and second data, the first data being output data obtained when label data in a training data set for the first inference model is input to the distillation model, the second data being output data obtained when input data paired with the label data is input to the first partial inference model that is the portion of the first inference model up to the predetermined intermediate layer of the first inference model, the input data paired with the label data being included in the training data set for the first inference model.

13. The method according to claim 12, wherein the distillation model is an inference model obtained by further being trained to reduce an error between third data and the label data, the third data being output data obtained when the second data is input to a model located downstream of the predetermined intermediate layer of the first inference model.

14. The method according to claim 10, wherein a plurality of input data for the second inference model are input to the second inference model, and a plurality of inference data resulting from the plurality of input data being input are used as an output data set in the training data set.

15. A method for generating a third inference model using a first inference model and a second inference model, when a type of output data that is output from the first inference model is the same as a type of input data that is input to the second inference model, the first inference model and the second inference model each being trained and having a multilayer structure, the method comprising:

preparing a first partial inference model that includes a portion of the first inference model from an input layer of the first inference model through a predetermined intermediate layer of the first inference model;

preparing a second partial inference model that includes a portion of the second inference model from a predetermined intermediate layer of the second inference model through an output layer of the second inference model;

generating the third inference model by disposing a glue layer between the first partial inference model and the second partial inference model, the glue layer connecting the predetermined intermediate layer of the first inference model and the predetermined intermediate layer of the second inference model; and training the third inference model, wherein:

the training includes training a connected model using a training data set according to input and output of the connected model, the connected model being obtained by connecting the glue layer and the second partial inference model, a plurality of output data that are output from the first inference model are input, as input data, to an inverse-function model having a reversed function of a function of a portion of the first inference model from the predetermined intermediate layer of the first inference model through an output layer of the first inference model, and a plurality of output data that are output from the inverse-function model are used as an input data set in the training data set.

16. The method according to claim 15, wherein the inverse-function model is one of:

an inference model mathematically constructed by arranging, in reverse order, all layers located downstream of the predetermined intermediate layer of the first inference model, using the output layer of the first inference model as an input layer of the inverse-function model; and an inference model obtained by constructing an autoencoder using all layers located downstream of the predetermined intermediate layer of the first inference model, and training the autoencoder using the plurality of output data that are output from the first inference model.

17. The method according to claim 15, wherein a plurality of input data for the second inference model are input to the second inference model, and a plurality of inference data resulting from the plurality of input data being input are used as an output data set in the training data set.

* * * * *